March 3, 1964    A. TOEGEL    3,123,509
MATCHED MOLD CONSTRUCTION OF HOLLOW REINFORCED
LAMINATED PLASTIC AIRFOILS
Filed April 7, 1958    3 Sheets-Sheet 1

INVENTOR.
ADOLPH TOEGEL
BY Jerome A. Gross
ATTORNEY

March 3, 1964  A. TOEGEL  3,123,509
MATCHED MOLD CONSTRUCTION OF HOLLOW REINFORCED
LAMINATED PLASTIC AIRFOILS
Filed April 7, 1958  3 Sheets-Sheet 2

INVENTOR.
ADOLPH TOEGEL
BY Jerome A. Gross,
ATTORNEY

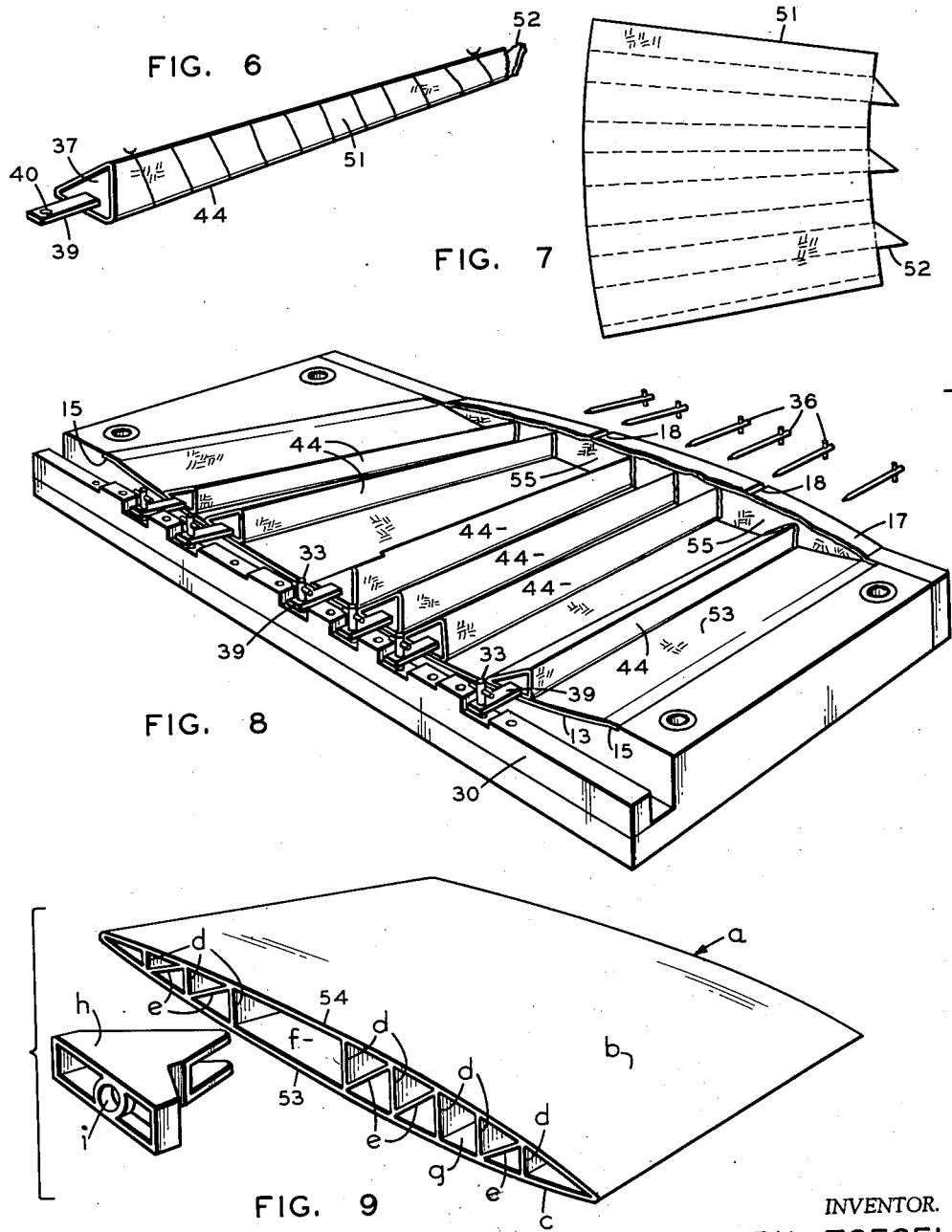

United States Patent Office 3,123,509
Patented Mar. 3, 1964

3,123,509
MATCHED MOLD CONSTRUCTION OF HOLLOW REINFORCED LAMINATED PLASTIC AIRFOILS
Adolph Toegel, Traverse City, Mich., assignor to Parsons Corporation, Detroit, Mich., a corporation of Michigan
Filed Apr. 7, 1958, Ser. No. 726,818
9 Claims. (Cl. 156—191)

This invention relates to the use of matched molds in constructing hollow structural articles, such as truss-webbed airfoils; and it has particular application to matched mold apparatus which includes spanwise internal mandrels or cores, and to methods of molding cloth-reinforced laminated plastic airfoils therewith.

Heretofore, matched molds have not been generally used for molding airfoils. Instead, reinforcing material such as fibrous glass cloth, has been coated and impregnated with fluid plastic resin and then molded against a single mold surface (either male or female) by fluid pressure, such as from an evacuated bag.

To mold thin-walled airfoil shells having thin reinforcing webs, to aircraft structural standards of uniform strength and weight, is a difficult problem, not heretofore solved satisfactorily. All wall and web thicknesses must be carefully controlled, as must the ratio of plastic material to laminating reinforcing material and its distribution through and around the laminating material.

The present invention solves these problems. In addition, the objects of the present invention include:

Providing molds including matched mold halves and internal mandrels which of themselves adjust their positions within the mold to yield desired thicknesses of the shell; providing for accurately formed, trussing cross-webs; and permitting the use of self-positioning mandrels in the molding of tapered airfoils.

Providing a method of match-molding articles of plastic reinforced by pervious sheets of reinforcing material, whereby there is achieved an even distribution of plastic through, over and around the material; whereby mandrels for hollow articles find their own positions under the pressures of molding; and whereby trussing cross-webs may be formed within such match-molded articles.

Prior practice of molding laminated airfoils with fibrous glass cloth and fluid plastic resins has required the separate wetting with fluid plastic of each sheet or wrapping of fibrous glass cloth as it was arranged in the mold or wrapped around a mandrel. However, for acceptably large ratios of cloth to resin, the bulk of the resin added to that of the cloth makes it difficult, if not impossible, to wrap mandrels with such wetted fabric closely and tightly enough to obtain perfect alignment and spacing of the laminations of cloth. Likewise it becomes most difficult to pre-position such wet-wrapped mandrels within matched mold halves and to pin them in place; especially when a large number of triangulated mandrels must be fitted, with close tolerances, between matched mold halves.

To overcome these difficulties and fulfill the purposes mentioned and others which will be apparent herefrom, I provide the apparatus and method illustrated in the accompanying drawings, in which:

FIGURE 6 is a perspective view of a typical mandrel shown wrapped with fibrous glass cloth;

FIGURE 7 is the developed flat pattern of the fibrous glass cloth wrapping shown in FIGURE 6;

FIGURE 8 is a perspective view of the lower mold half with layers of fibrous glass cloth laid thereon and a plurality of wrapped mandrels laid in place thereupon; and FIGURE 9 is a perspective view of an airfoil after molding, showing a molded root fitting bracket for insertion therein.

Figures 1, 2:
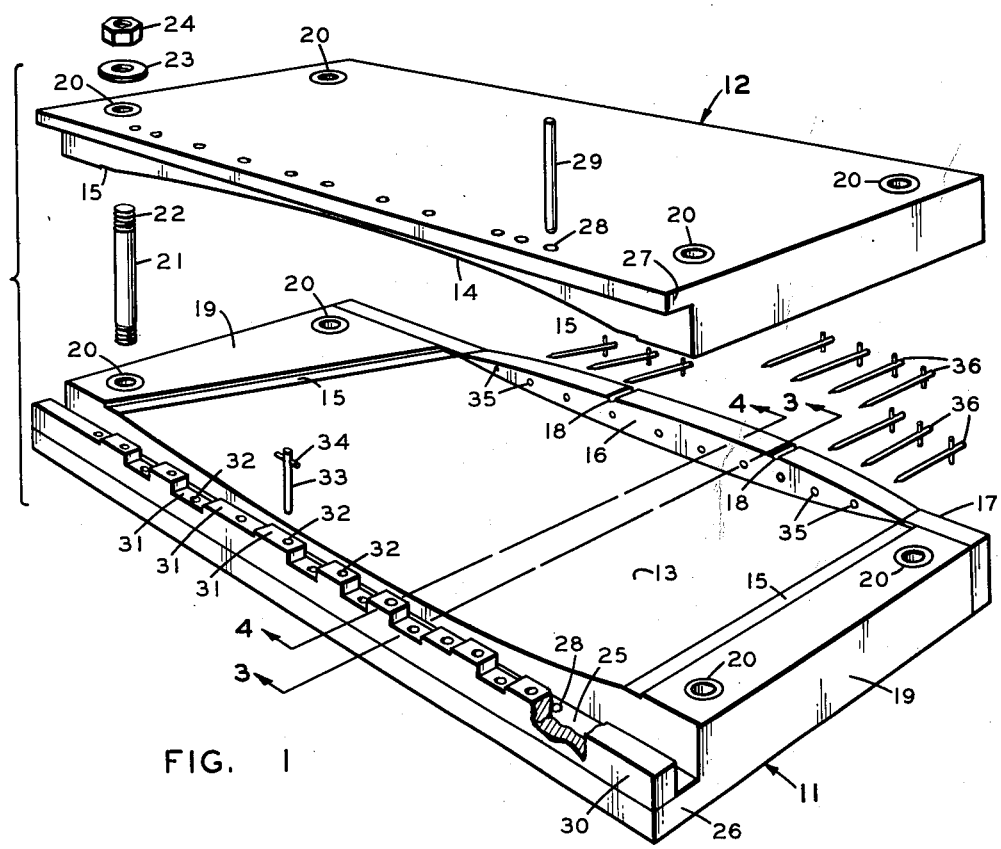
FIGURE 1 is an exploded perspective view of upper and lower matched mold halves, showing some of the pins utilized therewith.
FIGURE 2 is a perspective view of the mandrel set used within the mold halves of FIGURE 1.

Referring now to the drawings by the detail part numbers shown thereon, there is provided a lower mold half generally designated 11 and an upper mold half generally designated 12, formed of any suitable material such as laminated hardwood and being larger in planform than the airfoil to be molded therein. The lower mold half 11 includes a concave cavity surface 13 which conforms in contour to the outer surface of the airfoil to be molded therein on one side of its chord plane; and the upper mold half 12 has a concave cavity surface 14 to conform to the shape of the airfoil on the other side of its chord plane. The cavities 13, 14 have plane marginal portions 15 outwardly adjacent, their edges corresponding to the leading and trailing edges of the airfoil. The corresponding marginal portions 15 of the upper and lower molds are parallel to each other and, when the mold halves are assembled, are separate from each other an amount sufficient to accommodate the edges of the material to be molded therein.

As shown in FIGURE 1, the concave cavity surfaces 13, 14 taper toward one edge of the upper and lower mold halves 11, 12 to form an airfoil smaller at its tip than at its root. The lower concave cavity surface 13 terminates at such edge in a tip mold surface 16 which (in order to form a straight cut airfoil tip) rises perpendicular to the lower concave cavity surface 13. The shape of the tip surface 16 corresponds to that of the tip section of the airfoil. This surface 16 is the inner surface of a tip mold block generally designated 17, which is contoured along its upper edge to correspond with a tipwise continuation of the upper concave cavity surface 14. The tip portion of the mold apparatus is thus closed, save for resin run-off grooves 18 across the upper edge of the tip mold block 17.

Extending beyond the plane marginal portions 15, which bound the contour cavity surfaces 13, 14, the lower and upper mold halves 11, 12 have solid edge portions 19 utilized for aligning and clamping the mold halves together. The solid edge portions 19 have a plurality of bushed vertical bores 20, so that the mold halves 11, 12 may be arranged in alignment with each other and so held by an alignment pin 21 in each of the aligned sets of vertical bores 20.

When the solid edge portions 19 of the upper and lower mold halves are clamped against each other, they serve to establish the inside mold height between contoured concave cavity surfaces 13, 14 at the height desired to establish the airfoil thickness.

Simple clamping means, familiar in the art, are utilized to apply pressure between the mold halves 13, 14. As an example of such clamping means, the ends of the alignment pins 21 may have thread, nut and washer provisions 22, 23, 24.

Adjacent the root end of the lower cavity surface 13, the lower mold half 11 is equipped with a trough 25 which is a root-wise extension 26 of the lower mold half 11. The upper mold half 12 has a root-wise overhang 27; and aligned vertical bores 28 are provided as between the trough 25 and the overhang 27 closely adjacent to the root edges of the cavity surfaces 13, 14. The aligned vertical bores 28 are provided with stop pins 29, designed and located so that their midportions will abut the root ends of the mandrels hereafter described.

Outwardly from the trough 25 in the lower root-wise extension 26, the lower mold half 12 is provided with locator pin block 30 having a plurality of horizontally surfaced steps 31 along its upper surface, each having a vertical locator pin bore 32. The locator pin bores 32 accommodate mandrel root locator pins 33, which may be equipped at their upper ends with cross pins 34 for easy pulling The tip mold block 17 is penetrated by horizontal tip block bores 35, each of which accommodates a mandrel tip locator pin 36 which may be identical in construction with the mandrel root locator pins 33. The location of tip block bores 35 will be discussed hereinafter.

The mandrels which comprise the set shown in FIGURE 2 may likewise be formed of laminated hard wood. As is evident from a comparison of FIGURE 2 with FIGURES 1 and 9, the mandrels provided are tapered and are complementary to each other; and when arranged within the mold halves 11 and 12 provide between them the precise spaces necessary for the forming of the tapered airfoil generally designated $a$ in FIGURE 9, so that its upper and lower surfaces $b$, $c$, respectively, its vertical webs $d$, and its diagonal truss and webs $e$, may be formed to precise tolerances. The webs $d$ and $e$ provide desired voids within the airfoil $a$; the shape and volume of the mandrels to be described correspond generally with the shape and volume of such desired voids.

Figure 3:
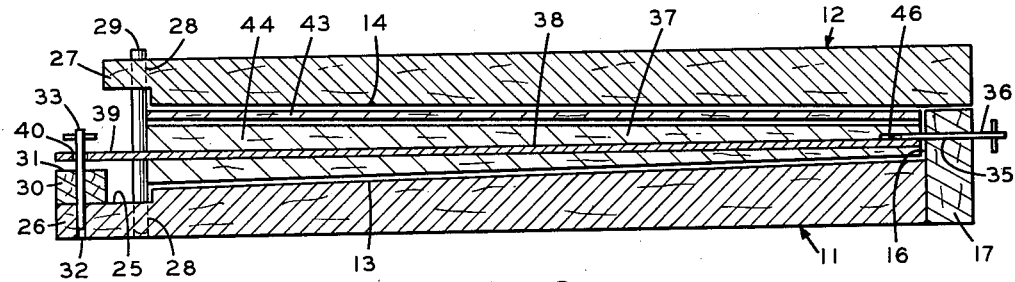
FIGURE 3 is a sectional view taken along line 3—3 of FIGURE 1, showing the mold halves of FIGURE 1 with the mandrel set of FIGURE 2 in place therein.
Figure 4:
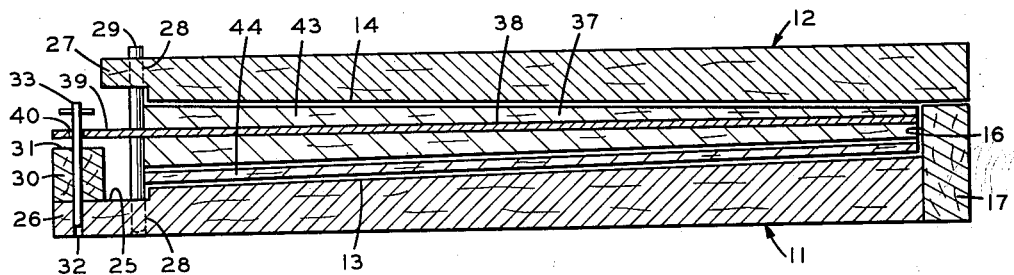
FIGURE 4 is a sectional view similar to FIGURE 3 and taken along line 4—4 of FIGURE 1.

Each of the mandrels of the set shown in FIGURE 2 has a mandrel body generally designated 37 which extends from the tip mold block 17 for a length at least equal to the full span of the cavity in the mold heads 11, 12; and the body may in fact be slightly longer so as to project at the root end of the cavity for abutment against the mid-portion of the vertical stop pin 29 provided for it, as shown in FIGURES 3 and 4. Each of the mandrel bodies 37 incorporates a lengthwise steel reinforcement 38, including root end projecting portion 39 having near its outermost end a vertical bore 40, spaced so that it may be aligned with and above the corresponding vertical locator pin bore 32 in the locator pin block 30, as shown in FIGURES 3, 4 and 8. The bore 40 is sufficiently greater in diameter than the mandrel root locator pin 33 which fits therethrough, as to permit the reinforcement 38 to "float" vertically thereon with a substantial degree of freedom.

The present mandrel bodies 37, precisely formed of hard wood and with reinforced lengthwise steel reinforcements 38, embody the concept of rigid mandrels having a substantial degree of freedom. This contrasts with that type of apparatus, well known in the prior art, wherein air-expanded or other resilient cores are used.

As shown in FIGURE 2, the mandrels generally designated 37 include a leading edge mandrel 41, and trailing edge mandrel 42, both of which are substantially triangular in cross-section. To achieve the triangulated construction of the airfoil shown in FIGURE 9, the greater number of the mandrels intermediate the leading and trailing edge mandrels 41, 42 are also triangular in cross-section. These substantially triangular intermediate mandrels each have a surface, lying adjacent either the upper or the lower skin of the airfoil shown in FIGURE 9, which is contoured slightly to provide the internal contour of the hollow airfoil there shown. Thus, the mandrels which have broad surfaces, or bases, presented adjacent the upper concave cavity surface 14 and which have apices adjacent the lower concave cavity surface 13, are referred to as the upper triangular mandrels 43; correspondingly, the generally triangular mandrels which have broad surfaces, or bases, adjacent the lower concave cavity surfaces 13 and apices adjacent the upper concave cavity surface 14 are identified as the lower triangular mandrels 44.

In order to provide fittings for attaching the airfoil $a$, diagonal trussing webs are omitted from two bays $f$ and $g$; the mandrels provided for these bases are nearly trapezoidal in cross-section and are numbered 45.

I have found it advisable to position the tips of certain of the mandrels 37 in definite relation to the tip mold block 17. Thus, the leading edge mandrel 41, the trailing edge mandrel 42, each of the lower triangular mandrels 44, and each of the trapezoidal mandrels 45, is provided at its tip with a horizontal bore 46, in registration with the corresponding horizontal tip bore 35 so that a tip pin 36 inserted through the tip bore 35 may project into and locate the tip of each of these mandrels. These mandrels whose tips are so located nevertheless are free to "float" tiltingly upward at the root end by virtue of the clearance between the vertical bore 40 and the pin 33. However, each of the upper triangular mandrels 43 is unrestrained at its tip. This freedom of the upper triangular mandrels 43 (which generally alternate between the mandrels whose tip end locations are fixed) permits the upper mandrels 43 to adjust themselves freely, both vertically throughout their entire length, and angularly by tilting; also by swinging in a chordwise plane about their mandrel root locator pins. This tilting and swinging is small in degree; yet it is great in reference to the permissible tolerances of the skin and webs which make up the airfoil $a$ shown in FIGURE 9.

The relative positions of an upper triangular mandrel 43 and a lower triangular mandrel 44 between the mold halves 11, 12 are shown in FIGURES 3 and 4, taken at chordwise stations corresponding to two of the adjacent horizontally-surfaced steps 31 and the locator pin block 30. Thus, the lower triangular mandrel 44, which occupies the greater part of the space within the mold cavity at the section shown in FIGURE 3, is pinned at its tip by the horizontal pin 36 into its tip bore 46; but it may float vertically upward and downward at its root end. In contrast, the upper triangular mandrel 43, which occupies the greater part of the mold cavity at the cross-section shown in FIGURE 4, though similarly pinned at its root end, is not pinned at its tip end, and thus may accommodate itself by angular movement perpendicular to the plane of the section shown in FIGURE 4. This has proved to achieve, to a remarkable extent, the accommodation of mandrels with respect to each other and with respect to the mold cavity itself, whereby to achieve effective control of thickness of the glass cloth and resin structure to be molded in the spaces therebetween.

Figure 5:
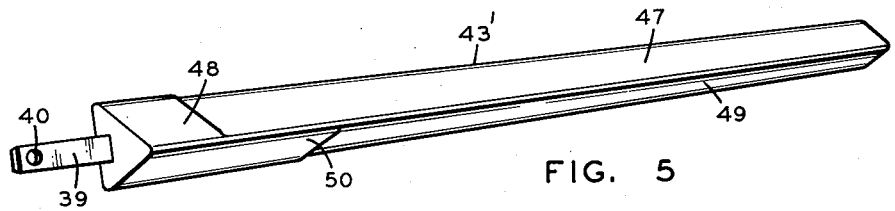
FIGURE 5 is a perspective view of a mandrel having provision for terminating the webs near the root end of the airfoil.

Comparing the mandrel set shown in FIGURE 2 with the completely molded airfoil structure shown in FIGURE 9, and specifically with reference to the large bay $f$ shown at the root of FIGURE 9, the chordwise width of the bay $f$ equals the width of the trapezoidal mandrel 45 and the chordwise surface or "base" of the adjacent upper mandrel designated 43', and shown alone in perspective in FIGURE 5, viewed from the apex which lies in the lower surface of the airfoil. Adjacent the root of the mandrel 43' the diagonal surface 47 has a thickened portion or step 48; likewise its vertical surface 49 (as shown in FIGURE 2) has a step 50. The steps 48 and 50 are equal in thickness to the diagonal or trussing webs $e$ and the vertical webs $d$ respectively, which are generally provided as reinforcements within the airfoil $a$ shown in FIGURE 9. Providing these steps 48 and 50 makes it possible to eliminate the diagonal and vertical webs $e$, $d$ respectively in the limited area of the steps alone, enlarging the bay $f$ to a width greater than the trapezoidal mandrel 45 alone would have provided. The bay $f$ at its root end receives the root filler bracket $h$ which is adhesively joined in the bay $f$ after molding of the airfoil $a$. The principal function of the filler bracket $h$ is to provide fitting or attachment means for the airfoil $a$; for this purpose it includes a cylindrical fitting bore $i$.

The method of match-molding reinforced shell airfoils, according to the present invention, consists generally of arranging layers of woven reinforcing cloth (without any fluid plastic being present) on a lower mold half, wrapping layers of woven reinforcing cloth over cores or mandrel members, adding a quantity of fluid plastic thereover, and arranging thereon layers of woven reinforcing cloth to abut the upper mold half. As a final step, the mold halves are tightened together into matched relationship to fix an interior mold height whereby to yield a predetermined interior volume. Thereby the fluid plastic is forced to distribute itself through, between and around the layers of woven reinforcing cloth, so as to thoroughly penetrate and permeate its interstices. Some excess of fluid plastic over that needed for the desired cloth-to-plastic ratio, should be used; pressure forces the excess out through the run-off grooves 18 and out of the root end of the mold.

The specific manner of accomplishing the present method, utilizing the mold elements shown in the drawings, may now be described:

Each of the mandrel bodies 37 may be wrapped with pervious reinforcing material, such as the fibrous glass cloth mandrel wrapping 51, and tied with thread, as shown in FIGURE 6. The cloth wrapping is preferably somewhat oversize; after being wrapped it is cut down at its ends to fit the mandrel. To close and reinforce the airfoil tip, the excess cloth is cut from two sides of the mandrel; that left projecting from the other side of the mandrel is tailored to a triangular tip cover portion 52. To facilitate arrangement in the mold, this is preferably a continuation of the portion of the wrapping 51 on the lower side of the mandrel 37. The wrapping, so tailored, will present a flat pattern somewhat as shown in FIGURE 7.

As to the stepped mandrel 43′, the cloth wrapping is cut back at the root end so as to stop at the steps 48 and 50; and the mandrels whose surfaces will lie adjacent these steps have their cloth wrappings similarly cut back thereat.

Sheets of fibrous glass cloth, referred to as the lower surface sheets 53, are cut to cover the lower concave cavity surface 13, fold up against the tip mold surface 16 and extend to the upper edge of the tip mold block 17. Chordwise, such fibrous glass sheets extend into and cover the plane marginal portions 15. Upper surface skin sheets 54 are cut to extend similarly chordwise to cover the entire upper concave cavity surface 14 and the plane marginal portions 15 at the leading and trailing edges thereof, and to meet the upturned tip portion 55 of the lower skin sheets 53.

The lower skin sheets 53, with their upturned tip portions 55 arranged against the tip mold surface 16, are carefully placed on the lower mold half, dry. The lower triangular mandrels 44, wrapped as shown in FIGURE 6, are arranged on the lower skin sheets 53 with their tip cover portions 52 upturned and in place; and the mandrel tip locator pins 36 are inserted through the tip block bores 35 so as to pierce the tip cover portions 22 of the skin sheets 53, and enter the mandrel tip bores 46. Each of the lower triangular mandrels 44 is secured by the root end projecting portion 39 of its steel reinforcement 38, to the locator pin block 30 by means of a vertical root locator pin 33.

At this stage it may also be convenient to place on the lower skin sheets 53 the cloth-wrapped leading edge mandrel 41, trailing edge mandrel 42 and trapezoidal mandrels 45, and similarly secure them in place at their root and tip ends.

A quantity of fluid plastic resin, of syrupy consistency, is then poured, roughly distributed, over the lower skin sheets 53 and the mandrels which have been so placed thereon. The upper triangular mandrels 43 (and any other mandrels theretofore not placed on the lower skin sheets 53) are then put in their positions.

The upper triangular mandrels 43, as shown are not equipped with mandrel tip bores 46. They are laid, in their substantially alternate positions, in place upon the other mandrels and the fluid plastic material which may be thereon, in such positions as they may freely assume; and the root end projecting portions 49 of their steel reinforcements 38 are similarly pinned to the locator pin block 30.

With all the quantity of fluid plastic material which is to be used, being poured over the mandrels within the mold—whether all at once or progressively as the mandrels are placed therein—the upper skin sheets 54 are laid in place to extend chordwise between the plane marginal portions 15 at the leading and trailing edges of the mold cavity, and to extend from the root to the tip thereof.

Alternately, skin sheets may be laid on the lower mandrel half starting at the trailing edge, extend forward to and around the airfoil leading edge, and then be folded back over the mandrels and plastic to form the upper surface skins.

Because of the taper of the mandrels and mold cavity, the following additional steps are taken: The upper mold half 12 is brought into registration with the lower mold half 11, the bushed vertical bores 20 are brought into alignment with each other, and the mold alignment pins 21 are inserted into the bushed vertical bores. Before the mold halves 11, 12 are tightened together, however, a stop pin 29 is inserted in each of the pairs of aligned vertical stop pin bores 28, so that its mid-portion fits snugly against the root end of each of the mandrel bodies 37. The mold halves 11, 12 are then drawn together by clamping means, such as by tightening the thread, nut and washer provisions 22, 23 and 24 on the alignment pins. The fluid pressure developed in the mold by such tightening would tend to "extrude" or force each of the tapered mandrel bodies outward at their root ends; the abutment thereagainst of the stop pins 29 restrains the mandrels from such endwise movement and avoids any tendency of the vertical bores 40 in the steel reinforcement root end 39 to bind against the locator pins 33.

The molding is then completed in the usual manner for the particular plastic molding resin employed which may be merely permitting the resin to harden. Then the mold halves 11, 12 are opened, the tapered mandrels 37 withdrawn and the molded article removed, and the skin edges extending into the plane marginal portions 15 are trimmed off. Finally, the larger bays *f* and *g* are fitted with adhesively-secured filler brackets such as the fitting bracket *h*.

It appears that the syrupy consistency of the plastic resin and the restraint offered by the several thicknesses of cloth and the narrow spaces provided between the adjacent mandrels and the contour mold surfaces, together result in a fluid pressure in response to which the mandrels adjust their positions to achieve equilibrium. At such equilibrium there tends to be a desired constant ratio, throughout the molded structure, of plastic resin to cloth. Thus, for feasible ratios of plastic resin to cloth, the skin and web thicknesses are controlled by fixing the number of thicknesses of the cloth present in each area of the airfoil, dry-wrapping the mandrels, positioning them with freedom between the mold halves, and letting the mandrels adjust their positions to achieve uniform resin distribution responsive to force exerted on the match-mold halves.

The recitation of specific details herein is not for purpose of limitation; and this specification is to be construed broadly in accordance with the claims which follow.

I claim:

1. Matched mold apparatus for manufacturing triangulated, internally-webbed tapered airfoils, comprising a lower tapered mold half of fixed predetermined cavity contour, a tip mold portion at the smaller end thereof, an upper tapered mold half of fixed predetermined cavity contour mating with the cavity contour of the lower mold half, means associated with said mold halves whereby to establish a desired inside mold height from one end of the taper to the other, pressure-applying clamping means for said mold halves, rigid internal mandrels tapering from thicker root ends to thinner tip ends thereof, said mandrels extending the span of the mold halves and being of generally triangular cross-section, said mandrels having bases adjacent the contoured surfaces of the lower and upper mold halves alternately, and having apices adjacent the surface opposite their base, and locator means positioning the mandrels between the mold halves with a degree of freedom therein, said locator means including mandrel root projections extending beyond the contoured mold halves at one end thereof, each root projection including a transverse vertical bore and a vertical pin therethrough, said locator means further including a projection extending between the tip mold portion and the tip of each of those mandrels having bases adjacent the contoured surface of the lower mold half, together with force-resisting stop means at the root ends of the mandrels whereby their spanwise location within the mold halves is maintained.

2. Matched mold apparatus for internally-webbed airfoils, comprising a lower mold half of fixed predetermined cavity contour, an upper mold half of fixed predetermined cavity contour mating with the cavity contour of the lower mold half, means associated with said mold halves whereby to establish the desired inside height of the mold, pressure-applying clamping means for said mold halves, a plurality of rigid internal mandrels whose shape and volume correspond to desired voids within such airfoils, and locator means positioning the rigid mandrels between the mold halves, said locator means including coupling means connecting the mandrel ends and a mold half, said coupling means permitting nonspanwise adjusting movements of the mandrels within the mold halves, whereby when material is molded therein its resistance to pressure of such clamping causes the mandrels to adjust to equilibrium positions.

3. Matched mold apparatus as defined in claim 2, said coupling means including mandrel projections extending beyond the contoured mold halves at one end thereof, each having a transverse bore and a pin therethrough.

4. Matched mold apparatus for manufacturing hollow airfoils with triangulated internal web reinforcements, comprising a lower mold half of fixed predetermined cavity contour, an upper mold half of fixed predetermined cavity contour mating with the cavity contour of the lower mold half, means associated with said mold halves whereby to establish the desired inside height of the mold, pressure-applying clamping means for said mold halves, a plurality of rigid internal mandrels extending the span of the mold halves and of generally triangular cross-section, said mandrels having bases adjacent the contoured surfaces of the lower and upper mold halves alternately and apices adjacent the surface opposite their base, and locator means positioning the mandrels between the mold halves, said locator means including coupling means connecting the mandrel ends and a mold half, said coupling means permitting non-spanwise adjusting movements of the mandrels within the mold halves.

5. Matched mold apparatus as defined in claim 4, further including an airfoil tip mold portion extending between the mold halves at one end thereof, said mandrel locator means including a projection extending between the tip mold portion and the tip of a mandrel.

6. Matched mold apparatus as defined in claim 4, further including an airfoil tip mold portion extending between the mold halves at one end thereof, said mandrel locator means including a projection extending between the tip mold portion and the tip of each of those mandrels having bases adjacent the contoured surface of the lower mold half.

7. The method of using matched mold apparatus of the type including an upper mold half of fixed predetermined cavity contour, a lower mold half of fixed predetermined cavity contour mating with the cavity contour of the upper mold half, and a plurality of rigid interior spanwise mandrels, for forming internally-webbed, laminated-reinforced plastic airfoils, comprising the steps of arranging a predetermined number of layers of pervious reinforcing material on the lower mold half, separately wrapping the mandrels with a predetermined number of layers of pervious reinforcing material, arranging the wrapped mandrels in chordwise alignment on the material upon the lower mold half, adding a quantity of fluid plastic over the wrapped mandrels, arranging a predetermined number of layers of pervious reinforcing material thereover, assembling the upper mold half into a position predetermined with reference to the lower mold half, and tightening it against the resistance of the fluid plastic, whereby to distribute the plastic under fluid pressure through, between, and around the layers of reinforcing material and by such fluid pressure to adjust the positions of the rigid interior mandrels, with reference to the upper and lower mold halves and to each other, then hardening to form a molded article, and then removing from the mold apparatus.

8. The method of using matched mold apparatus of the type including a tapering upper mold half of fixed predetermined cavity contour, a tapering lower mold half of fixed predetermined cavity contour mating with the cavity contour of the upper mold half including a tip mold portion at its smaller end, and a plurality of rigid interior spanwise mandrels, for forming an internally-webbed laminated-reinforced plastic tapered airfoil having a closed tip, comprising the steps of arranging a layer of pervious reinforcing material on the lower mold half with a fold of material sufficient to cover the inner surface of the tip mold portion upfolded thereagainst, separately wrapping the mandrels with layers of pervious reinforcing material and leaving a fold of material projecting on one surface at the tip of each mandrel sufficient to cover such tip, arranging the wrapped mandrels in chordwise alignment on the material upon the lower mold half with the mandrel tip end material pressed against the upfolded material at the tip mold portion, blocking the root ends of the mandrels against endwise movement out of the mold, adding a quantity of fluid plastic over the wrapped mandrels, arranging a layer of pervious reinforcing material thereover, assembling the upper mold half into a position predetermined with reference to the lower mold half, and tightening it against the resistance of the fluid plastic, whereby to distribute the plastic under fluid pressure through, between, and around the layers of reinforcing material and to adjust the height and chordwise spacing of the rigid interior mandrels with reference to the upper and lower mold halves and to each other, then hardening to form a molded article, and then removing from the mold apparatus.

9. The method of using matched mold apparatus of the type including an upper mold half of fixed predetermined cavity contour, a lower mold half of fixed predetermined cavity contour mating with the cavity contour of the upper mold half, and a plurality of rigid interior spanwise mandrels of triangular cross-section, for forming truss-webbed, laminated-reinforced plastic articles, comprising the steps of arranging a layer of pervious reinforcing material on the lower mold half, separately wrapping the mandrels with layers of pervious reinforcing material, arranging in chordwise alignment on the material upon the lower mold half the outer side surfaces of a first group of wrapped triangular mandrels so that apex edges of said mandrels extend away from said lower mold half, then arranging alternately adjacent said mandrels a second group of wrapped triangular mandrels so that the apex edges thereof are presented adjacent the lower mandrel half and their outer side surfaces are presented upward, then adding a quantity of fluid plastic over all said wrapped mandrels, then arranging a layer of pervious reinforcing material thereover, then assembling the upper mold half into a position predetermined with reference to the lower mold half, and tightening it against the resistance of the fluid plastic, whereby to distribute the plastic under fluid pressure through, between, and around the layers of reinforcing material and by such fluid pressure to adjust the positions of the rigid interior mandrels to equilibrium under such fluid pressure, then hardening to form a molded article, and then removing from the mold apparatus.

References Cited in the file of this patent

UNITED STATES PATENTS

| | | |
|---|---|---|
| 809,143 | Schutz | Jan. 2, 1906 |
| 2,315,394 | Brosius | Mar. 30, 1943 |
| 2,445,290 | Gonda | July 13, 1948 |
| 2,478,267 | Hickler | Aug. 9, 1949 |
| 2,519,036 | Ford et al. | Aug. 15, 1950 |
| 2,525,644 | Brunson | Oct. 10, 1950 |
| 2,572,924 | Gonda | Oct. 30, 1951 |
| 2,773,792 | Nebesar | Dec. 11, 1956 |
| 2,800,945 | Schilling | July 30, 1957 |
| 2,802,766 | Leverenz | Aug. 13, 1957 |
| 2,863,797 | Meyer | Dec. 9, 1958 |
| 2,954,828 | Marchetti | Oct. 4, 1960 |

FOREIGN PATENTS

| | | |
|---|---|---|
| 690,981 | Great Britain | Mar. 7, 1951 |
| 865,382 | France | Feb. 24, 1941 |